United States Patent [19]

Gardos

[11] Patent Number: 5,737,448
[45] Date of Patent: Apr. 7, 1998

[54] METHOD AND APPARATUS FOR LOW BIT RATE IMAGE COMPRESSION

[75] Inventor: Thomas R. Gardos, Hillsboro, Oreg.

[73] Assignee: Intel Corporation, Santa Clara, Calif.

[21] Appl. No.: 490,823

[22] Filed: Jun. 15, 1995

[51] Int. Cl.$^6$ .............. G06K 9/36; G06K 9/46; H04N 1/41
[52] U.S. Cl. .............. 382/240; 348/441; 358/429
[58] Field of Search ................. 382/240, 242, 382/249, 118, 282, 232, 233, 236, 251; 348/441, 384, 406, 422, 402, 405; 358/426, 432; 341/50, 65, 107; 375/245

[56] References Cited

U.S. PATENT DOCUMENTS

| | | | |
|---|---|---|---|
| 4,843,468 | 6/1989 | Drewery | 348/441 |
| 5,136,371 | 8/1992 | Savatier et al. | 348/419 |
| 5,231,487 | 7/1993 | Hurley et al. | 348/391 |
| 5,315,670 | 5/1994 | Shapiro | 382/240 |
| 5,543,935 | 8/1996 | Harrington | 358/429 |

OTHER PUBLICATIONS

Skarbek, W., Agui, T., and Nakajima, M., "Software Tools for Hilber Scan of Large Images", Transactions of the IEICE, pp. 561–564 vol. E72, No. 5 May 1989.

Yang, K., Wu, L, and Mills, M., "Fractal Based Image Coding Scheme Using Peano Scan". Proceedings of IEEE ISCAS pp. 2301–2304 1988.

Cody, M., "The Wavelet Packet Transform", Dr. Dobbs Journal pp. 44–46, 50,52,54, and 100. Apr. 1994.

Skarbek, W., Agui, T., and Nakajima, M., "Compression of Dithered Binary Images Using Hilber Scan", Transactions of the IEICE, pp. 1235–1242, vol. E72, No. 11, Nov. 1989.

Ansari, A., and Fineberg, A., "Image Data Ordering and Compression Using Peano Scan and Lot". IEEE Transactions on Consumer Electronics, pp. 436–445, vol. 38, No. 3, Aug. 1992.

Perez, A., Kamata, S., and Kawaguchi, E., "Hilbert Scanning Arithmetic Coding for Multispectral Image Compression", SPIE vol. 1567 pp. 354–361 Applications of Digital Image Processing XIV.

Butz, A., "A Alternative Algorithms for Hilbert's Space Filling Curvers", IEEE Transactions on Computers, pp. 424–426, Apr. 1971.

(List continued on next page.)

*Primary Examiner*—Leo Boudreau
*Assistant Examiner*—Wenpeng Chen
*Attorney, Agent, or Firm*—Blakely, Sokoloff, Taylor & Zafman

[57] ABSTRACT

The invention is a method and apparatus for ordering pixels in a matrix of pixels. The matrix is first divided into multiple cells, where each cell is a smaller matrix of pixels. For each cell in the matrix, an ordering is chosen for the pixels in the cell, and each cell is identified by the pixel ordering for the cell and a direction to a next cell in the matrix. A decision is made on how to represent the ordered block, by first computing a number of non-zero pixels in the current block to a number of runs of zero valued pixels in the current block to compute and intra coefficient count. The pixels in the current block are subtracted from the pixels in a second ordered block in a second image to compute an inter block, and an inter coefficient count is computer by adding a number of non-zero pixels in the inter block to a number of runs of zero valued pixels in the inter block. The block is either discarded, retained, or replaced with the inter block depending on a comparison of the inter coefficient count and the intra coefficient count. Once the block decision is made, the pixels in the block are quantized, using a quantization value determined by computing a first intra coefficient count for a corresponding block in a prior frame. A second intra coefficient count is computed for the block in the current frame, and the percentage difference between the intra counts is scaled by a constant to compute a quantization delta. The quantization delta is added to the quantization value for the prior block to determine a quantization value for the current block.

36 Claims, 10 Drawing Sheets

OTHER PUBLICATIONS

Shapiro, J. "An Embedded Wavelet Hierarchical Image Coder", ICASSP, pp. 657–660, vol IV Mar. 1992.

Reusens, M., and Ebrahimi, T., "New Techniques for Subband/Wavelet Transform Coefficient Coding Applies to Still Image Compression", SPIE Vol 1771 pp. 444–457 Applications of Digital.

"Manipulation and Presentation of Multidimentional Image Data Using the Peano Scan" R. J. Stevens, A. F. Lehar, and F. H. Preston, IEEE Trans. on Pattern Analysis and Machine Intelligence, vol. PAMI–5, No. 5, 520–526, (Sep. 1983).

| MAP INDEX | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| DIRECTION | R | R | D | L | L | D | R | D | L | D | R | R | U | U | R | D | D | R | U | U | U | L | U | R |
| DIRECTION INDEX | 0 | 0 | 1 | 2 | 2 | 1 | 0 | 1 | 2 | 1 | 0 | 0 | 3 | 3 | 0 | 1 | 1 | 0 | 3 | 3 | 3 | 2 | 3 | 0 |

*Figure 5a*

| MAP NAME, ORIENTATION, AND DIRECTION | ALGORITHMIC DESCRIPTION |
|---|---|
| MAP A | MAP A [i] , i = 0, ...,23 |
| MAP A ROTATED CW 90° | (MAP A [i] + 1) mod 4, i = 0, ...,23 |
| MAP A ROTATED CW 180° | (MAP A [i] + 2) mod 4, i = 0, ...,23 |
| MAP A ROTATED CW 270° | (MAP A [i] + 3) mod 4, i = 0, ...,23 |
| MAP A, REVERSE DIRECTION | (MAP A [i] + 2) mod 4, i = 23, ...,0 |
| MAP A, REVERSE DIRECTION, ROTATED CW 90° | (MAP A [i] + 3) mod 4, i = 23, ...,0 |
| MAP A, REVERSE DIRECTION, ROTATED CW 180° | (MAP A [i] + 0) mod 4, i = 23, ...,0 |
| MAP A, REVERSE DIRECTION, ROTATED CW 270° | (MAP A [i] + 1) mod 4, i = 23, ...,0 |

| INDEX | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| OFFSET | 0 | 3 | 3 | 2 | 3 | 0 | 0 | 1 | 3 | 0 | 0 | 1 | 2 | 1 | 1 |
| DIRECTION | B | F | F | B | F | B | B | F | F | B | B | F | B | F | F |
| NEXT STEP | R | U | L | U | U | R | D | R | U | R | D | D | L | D | R |

| INDEX | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|
| OFFSET | 0 | 0 | 3 | 3 | 2 | 2 | 3 | 3 | 2 | 0 | 3 | 3 | 2 | 1 | 2 |
| DIRECTION | B | B | F | F | B | B | F | F | B | B | F | F | B | F | B |
| NEXT STEP | R | R | U | L | U | U | R | L | U | R | U | L | L | D | L |

| INDEX | 30 | 31 | 32 | 33 | 34 | 35 | 36 | 37 | 38 | 39 | 40 | 41 | 42 | 43 | 44 |
|---|---|---|---|---|---|---|---|---|---|---|---|---|---|---|---|
| OFFSET | 2 | 3 | 1 | 2 | 2 | 3 | 2 | 1 | 1 | 0 | 2 | 1 | 1 | 0 | 2 |
| DIRECTION | B | F | F | B | B | F | B | F | F | B | B | F | F | B | B |
| NEXT STEP | U | L | D | L | U | L | L | D | R | D | L | D | R | D | L |

| INDEX | 45 | 46 | 47 |
|---|---|---|---|
| OFFSET | 1 | 1 | 0 |
| DIRECTION | F | F | B |
| NEXT STEP | D | R | |

METHOD AND APPARATUS FOR LOW BIT RATE IMAGE COMPRESSION

BACKGROUND

1. Field of the Invention

The invention relates to the compression of digital information. Specifically, the invention is a method and apparatus for lossy compression of digital video information.

2. Art Background

As the processing power and information storage capacity of computers increases, more applications of computers become feasible. One family of promising new applications involves the manipulation and storage of video information using personal computers. The video information, as with all information processed by a computer, must be converted into a digital format compatible with computers. This may be accomplished using common equipment such as digital cameras and video capture boards. Video consists of a series of frames, each frame representing a still image captured in time. When digitized, each image consists of a two dimensional matrix of pixels, each pixel typically representing the color and intensity of a single point in the image. Each pixel is stored as a binary number inside the computer.

Digital video information requires a great deal of storage capacity. For example, consider a typical VGA monitor with 640 pixels of resolution in the horizontal dimension and 480 pixels of resolution in the vertical direction. A video frame comprising one-quarter of the VGA screen has the dimensions of 320 by 240 pixels. A one-quarter screen, ten second video clip recorded at 30 frames per second has 320×240×30×10 pixels, or nearly 24 million pixels. Assuming each pixel requires one byte of digital memory to store, then the ten second video clip requires approximately 24 Mb of digital storage. Efficient video compression techniques are thus highly desirable to reduce the storage requirements of digital video information.

Efficient compression becomes even more critical when the digital video is to be transmitted in real-time between two computer systems, such as for computer-based video conferencing applications. These applications require fast and efficient compression and decompression of digital video information, because the compression and decompression must typically occur in real-time, and because the bandwidth of phone lines is limited.

In a typical application, video information is first captured from a local camera on a first computer, compressed, transmitted over a phone line, then uncompressed and displayed on a second computer. The transmitted video information is called a video stream. The bandwidth requirements of a video stream are measured in bits-per-second, or bps. A typical tradeoff involves bits-per-second versus video quality. Lower bps rates result in video which appears blurrier to the viewer and less smooth in motion than the same video sequence transmitted at a higher bps rate. Often, the video stream must share bandwidth on the phone line with other types of digital data, such as digital voice and annotation information from the computer screen. It is thus desirable to adjust the bps of the video stream dynamically to compensate for the demands of other types of data for bandwidth on the phone line.

A useful video compression method which is fast and efficient is the Discrete Wavelet Transform, or DWT. The DWT performs a decomposition of an image in the transform domain. The first step involves decomposing the image into four blocks. The first block is obtained by low pass filtering and downsampling the image in both the horizontal and vertical directions. This first block is denoted by the symbol LL. The second block is obtained by low pass filtering and downsampling the image in the horizontal direction and high pass filtering and downsampling the image in the vertical direction. This block is denoted by the symbol LH. The first letter of the symbol indicates whether the image was low-pass or high-pass filtered in the horizontal direction. The second letter denotes whether the image was low-pass or high-pass filtered in the vertical direction. The third and fourth blocks are denoted by the symbols HL and HH, and are obtained by operations corresponding to the symbols. The operation of decomposing the image into four blocks in this manner is called a four band split operation. The actual choice of low-pass and high-pass filters is an implementation choice.

In one implementation of the DWT, the four band split is applied successively two additional times on the LL block to obtain still more blocks. The additional blocks which are obtained by the two successive applications of the four band split to the LL block are: <LL.LH>, <LL.HL>, <LL.HH>, <LL.LL.LL>, <LL.LL.LH>, <LL.LL.HL>, <LL.LL.HH>. The first symbol in a set denotes the original LL block. The second and third symbols denote the successive filtering operations performed on the original LL block.

The blocks produced by the application of the DWT are relatively large and further reduction in the amount of information needed to represent the blocks is required. To reduce the storage requirements of the blocks further, the pixels in the block are reordered to exploit similarities between pixels in local spacial regions of the block. After ordering the pixels in each block, the pixels are quantized. The purpose of quantization is to reduce the number of bits used to represent each pixel. In the process of reducing the number of bits per pixel, it is necessary to sacrifice the resolution between successive pixel values. For example, a quantizer may input pixels represented by eight bits, and output pixel with a smaller representation, say, three bits. In the process, the number of discrete pixel values is reduced from $2^8$=256 discrete values to $2^3$=8 discrete values.

After quantization, the pixels in a block are coded to further reduce the storage requirements of the block. Many forms of coding are possible, but two common forms are run-length coding and entropy coding. Run-length coding is the representation of a series, or run, of like-valued pixels with the pixel value and the length of the run. For example, a run of six zero-valued pixels can be represented as <6,0>, where the first number is the length of the run and the second number is the value of the pixel. In this example, run-length coding reduces the storage requirements of the six pixels from six bytes (assuming one byte per pixel) to only two bytes. The storage requirements of the run-length encoded block may be further reduced using additional coding techniques such as Huffman and Arithmetic coding, which are well-known in the art and which have varying implementations.

The efficiency of the final coding step in reducing the storage requirements of the block depends in large part on the technique which is applied for reordering the pixels in the block. The reordering is a mapping from the two-dimensional space of the pixel matrix to the one-dimensional space of a linear array. A common technique for such mapping is the Peano scan, which utilizes the Peano space filling curve.

The Peano scan visits adjacent pixels of a matrix of pixels in both the horizontal and vertical directions, in such a manner as to highly exploit the correlation between pixels in a local spacial region. After the ordering of pixels by Peano scan, the sequence of pixels is mostly "flat" in terms of intensity and color variations. Viewed from the frequency domain, the Peano scan shifts more energy of the image to low frequency components. Ordering the pixels in this manner increases the efficiency of subsequent quantization and encoding steps on the block.

Figure 1A:
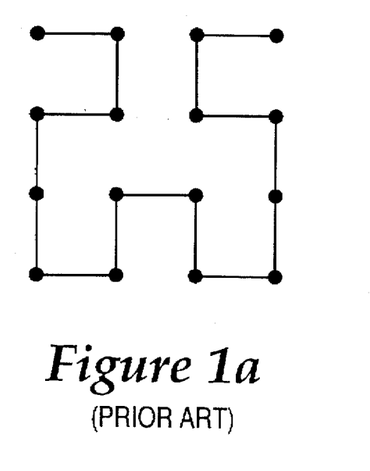
FIG. 1a. illustrates the basic element or the Peano scan path
Figure 1B:
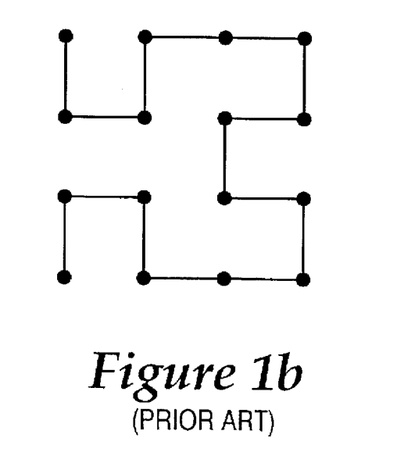
FIG. 1b. shows a 90° rotation of the basic Peano element
Figure 1C:
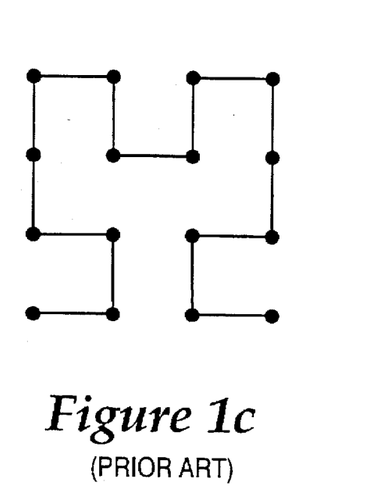
Figure 1D:
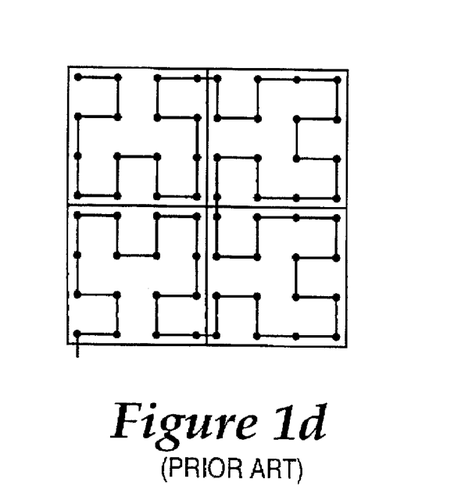
FIG. 1d. shows the 4 by 4 Peano elements combined to form and 8 by 8 Peano element

The Peano scan is generated recursively from a 4 by 4 basic element shown in FIG. 1a. This 4 by 4 basic element represents a sequence of 16 steps. Each step consists of moving in one of four directions; right, left, up, or down. These four directions can be encoded by two bits. To generate the next-larger size of the basic 4 by 4 element (an 8 by 8 element), two different rotations of 90° and 180° of the basic element are required. FIG. 1b and FIG. 1c show the 90° and 180° rotations of the basic element. The basic element and the two rotations may be combined to form an 8 by 8 basic element, as shown in FIG. 1d. The 8×8 basic element is then rotated in the same fashion as the 4 by 4 basic element, and the resulting rotations combined with the basic element to form a 16×16, Peano element. In this manner a Peano scan of a size of $2^n$, n>2, can be generated recursively. Because of this recursive quality of the Peano scan, the Peano scan requires very little overhead, or side information, to record the sequence of steps involved in generating the scan path.

One disadvantage of the Peano scan technique is that because it is recursive, the Peano scan can only fully traverse a matrix of pixels which has a power-of-two size dimensions. This can be overly restrictive, since many practical applications, including video conferencing applications, involve pixel matrices which do not satisfy this power-of-two constraint. It is desirable in these applications to order the pixels in a matrix in a manner which exploits the local correlation between the pixels, but which is more flexible than the recursive Peano scan so that it may be applied to "mixed-radix" size pixel matrices.

SUMMARY OF THE INVENTION

A method and apparatus for reducing the storage requirements of a matrix of pixels is described. A novel pixel ordering technique is presented which is applicable to non-power-of-two sized images, and which may be applied to exploit the macro-geometry of the matrix. A novel block decision step and non-linear quantization technique are also presented for further reducing the storage requirements of the matrix.

The matrix is first divided into multiple cells, where each cell is a smaller matrix of pixels. For each cell in the matrix, an ordering is chosen for the pixels in the cell, and each cell is identified by the pixel ordering for the cell and a direction to a next cell in the matrix. An inter block is computed by subtracting the pixels in the current matrix from the pixels in a corresponding matrix in a prior frame. An inter coefficient count is computed by counting the number of non-zero pixels and zero-run lengths in the inter block. An intra coefficient count is computed by counting the number of non-zero pixels and zero-run lengths in the current matrix. A block decision is made, either before or after quantization, by comparing the pixels in the current matrix to the inter coefficient count. The current matrix is either discarded, retained, or replaced with the inter block according to a comparison of the intra coefficient count and the inter coefficient count, to form a decision matrix. A quantization value for the decision matrix is computed by computing intra coefficient counts for both the decision matrix and a corresponding matrix in a prior frame. The percentage difference between the coefficient counts is scaled by a constant, and the result added to the quantization value of the matrix in the prior frame to compute a quantization value for the decision matrix.

BRIEF DESCRIPTION OF THE DRAWINGS

FIG. 1b. shows a 180° rotation of the basic Peano element

FIG. 3. illustrates the steps for reducing the storage requirements of a video frame, incorporating the present invention FIG. 4a. illustrates a possible primary ordering of a 5 by 5 cell in one embodiment of the current invention FIG. 4b. a possible first rotated ordering of the 5 by 5 cell of FIG. 4a FIG. 4c. illustrates a possible second rotated ordering of the 5 by 5 cell in FIG. 4a FIG. 4d. illustrates a possible third rotated ordering of the 5 by 5 cell in FIG. 4a FIG. 4e. illustrates a possible reverse ordering of the primary ordering for the 5 by 5 cell of FIG. 4a FIG. 4f. illustrates a possible reverse ordering of the first rotated ordering FIG. 4g. illustrates a possible reverse ordering of the second rotated ordering FIG. 4h. illustrates a possible reverse ordering of the third rotated ordering FIG. 5a. is a table illustrating a numerical representation of the primary ordering FIG. 5b. is a table illustrating one example of the numerical representations of the rotated and reverse orderings FIG. 6. illustrates a head and shoulders scan path through the video frame FIG. 7. illustrates a 40 by 30 block with cells ordered to exploit the head-and-shoulders content of the block FIG. 8. illustrates the ordering of the pixels in a block defined in terms of the ordering of each cell in the block and the direction between cells FIG. 9. is a flow chart of the steps of one embodiment for performing a block decision FIG. 10. is a flow chart of the steps of one embodiment for computing the quantization value for a current block

DETAILED DESCRIPTION

A novel method and apparatus are presented for low bit-rate video coding. The method and apparatus are used in the preferred embodiment in conjunction with a wavelet decomposition. A new pixel ordering technique for non-power-of-two size images is presented. In addition, an adaptive nonlinear quantization technique is presented, along with a block decision step which is applied after ordering the pixels and either before or after quantization. The invention performs particularly well in video conferencing environments.

Figure 2:
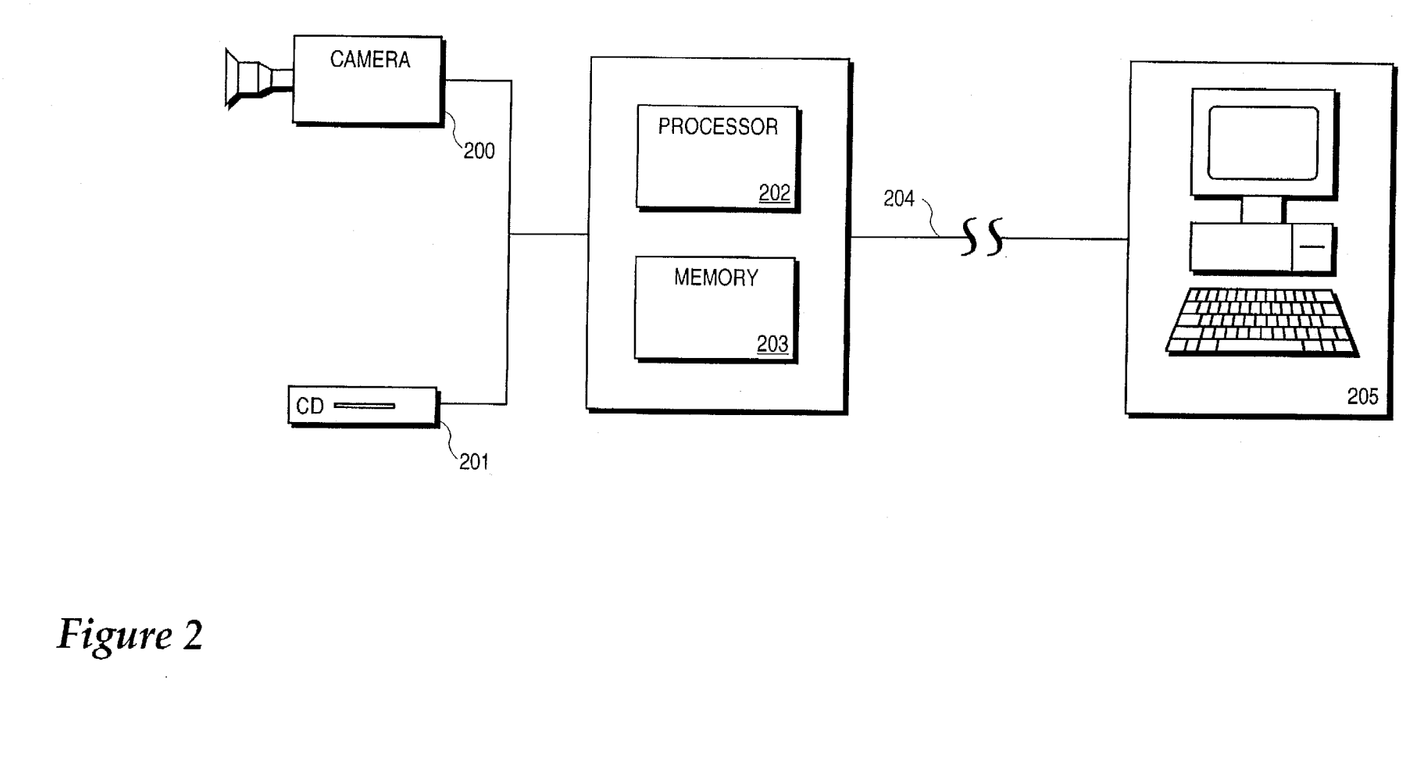
FIG. 2 shows a system for the capture, processing, and transmission of digital video information in which the present invention may be used.

FIG. 2 shows one embodiment of a system for processing digital video information in which the current invention may be used. In this embodiment, the digital video is supplied by either a camera 200 or a CD player 201. The information is provided to a processor 202 and a memory 203, which in the preferred embodiment are part of a personal computer system. The video information is processed to reduce its storage or bandwidth requirements, and then the information is transmitted over transmission path 204 to a second computer system 205. The second computer system 205 may store the video information in memory, or display it on a video monitor.

Figure 3:
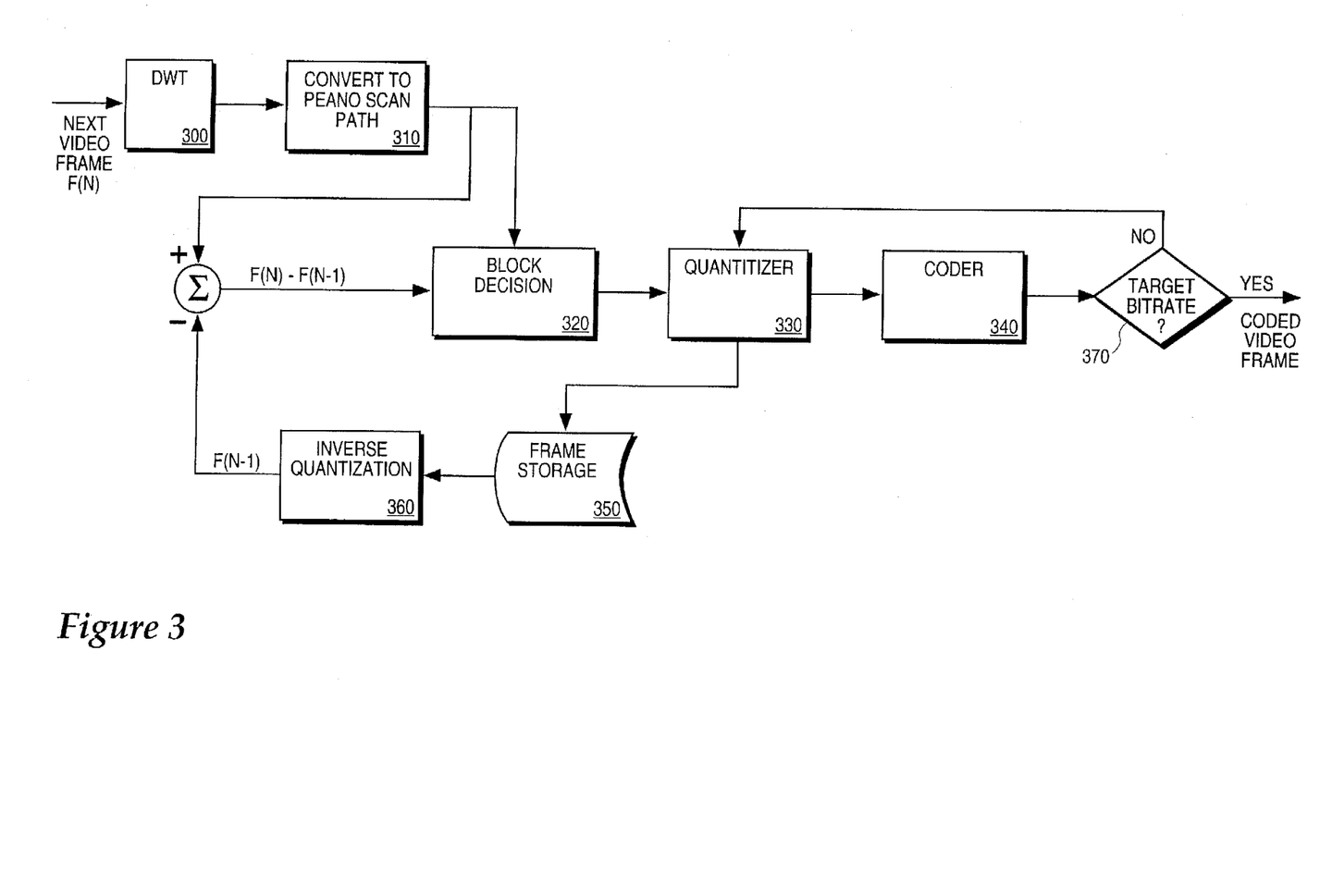

The sequence of steps for reducing the storage requirements of a video frame, incorporating the present invention, is illustrated in FIG. 3. Initially, a forward Discrete Wavelet Transform (DWT) is performed on a video frame 300. In the present embodiment, the wavelet transform is applied to 160×120 pixel video frames over three octaves. The invention is not limited to any particular transform method nor to any particular implementation of the DWT. For example, DWTs comprising seven and nine tap linear phase filters, and four and five tap nonlinear phase filters, may be employed. In general, linear phase filters are preferable because they minimize edge dispersion in the reconstructed frame; however, non-linear filters are sometimes desirable because they reduce the effect of quantization errors. The impact of various filter choices on the performance of the DWT is well known and studied in the art.

Referring to FIG. 3, once the frame is decomposed into blocks using the DWT, it is desirable to map the pixels from two dimensional space to one dimensional space 310. This mapping should exploit correlation between pixels in local spatial regions of the block. Prior art techniques employ Peano scan paths for this purpose. The Peano scan path can be overly restrictive since, due to its recursive nature, it is applicable only to power-of-two sized images. Many practical applications, including personal computer based video conferencing, do not satisfy this constraint. The present invention employs a mapping which preserves the desirable properties of the Peano scan, but which is applicable to "mixed-radix" size images, i.e. images with dimensions which are not powers of two.

The present invention generates the scan path through a block by first dividing the block into cells. Unlike the Peano scan path of the prior art, the cells need not be power-of-two sized dimensions. Instead, the dimensions of the cell are derived in one embodiment as the least common factor of the block width and the block height. For example, for a block of pixels which is 20 pixels wide and 15 pixels deep, the cell size is chosen as 5 by 5 pixels, because 5 is the least common factor of 20 and 15. The cell dimensions may be limited to a lower limit, to prevent the cell size from becoming too small for practical application. For example, a cell size of 2 by 2 pixels is too small because such a cell contains only four pixels, and there is very little freedom in the ordering of four pixels. A practical lower limit for the cell dimensions is 4 by 4 pixels, which is a cell containing 16 pixels. Other embodiments are possible in which the least common factor of the block dimensions is not determined from the cell dimensions. For example, a multiple of the least common factor may be chosen. Such other embodiments would function in substantially the same fashion as the preferred embodiment herein described.

Figure 4A:
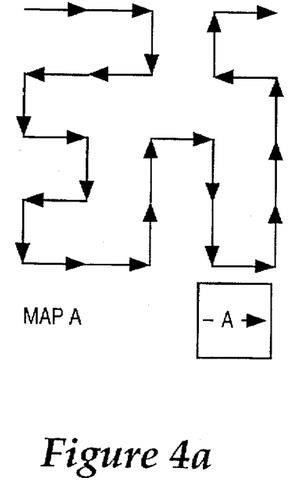
Figure 4B:
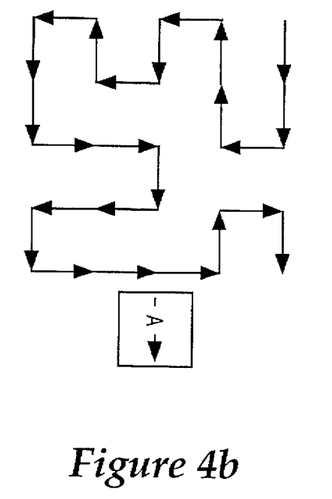
Figure 4C:
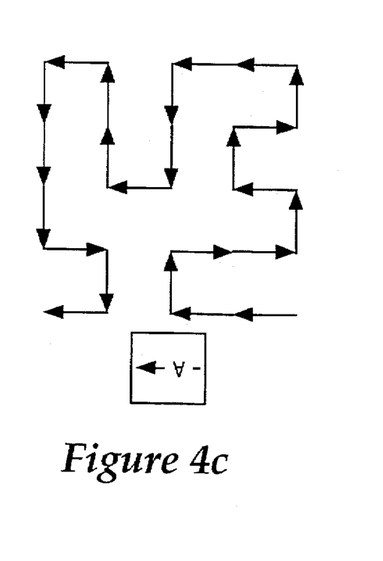
Figure 4D:
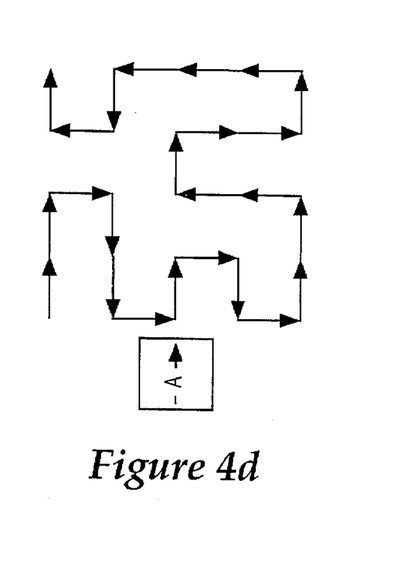
Figure 4E:
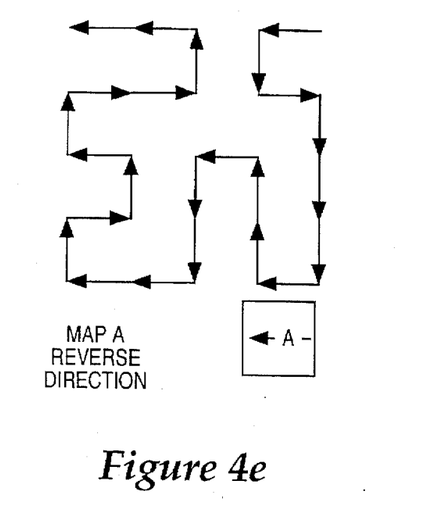
Figure 4F:
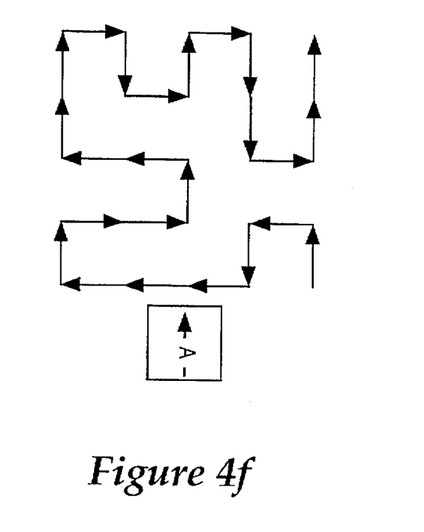
Figure 4G:
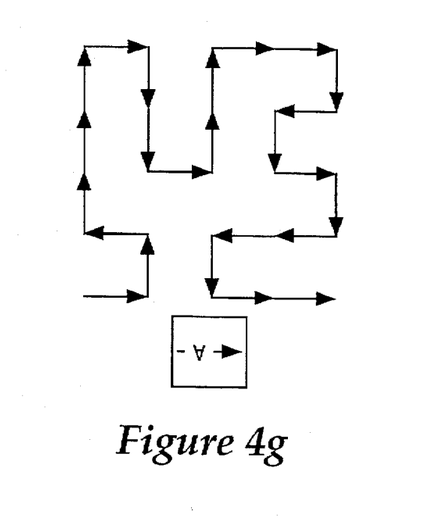
Figure 4H:
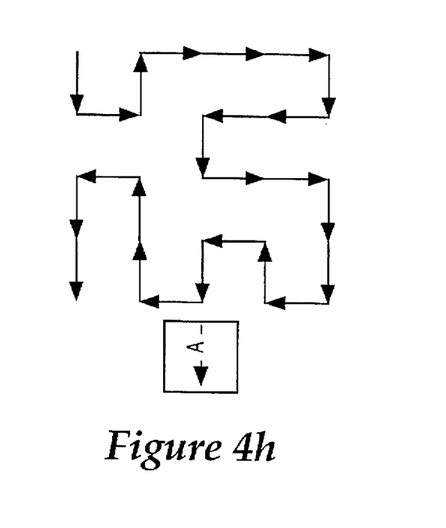

Once the block is divided into cells, the next step is to order the pixels within each cell. A primary ordering is chosen through a cell such that the path visits each pixel in the cell in a manner which exploits the correlation between neighboring pixels. In this regard, the ordering is very similar to the ordering derived from a Peano scan path, although it may not have the recursive properties of the Peano path. Like the Peano path, the primary ordering should visit adjacent pixels in the cell in a manner which exploits the correlation in color and intensity between pixels in a local spacial region. The primary ordering should also begin and end on pixels which share a common face of the cell, so that rotations of the primary ordering may be generated which interface cleanly with one another to form larger orderings. FIG. 4a illustrates one possible primary ordering of the pixels in a 5 by 5 cell. The primary ordering is denoted by the symbol MapA. The primary ordering is then rotated 90° to form a first rotated ordering, as shown in FIG. 4b. The primary ordering is also rotated 180° and 270° to form a second and third rotated ordering, respectively, and shown in FIG. 4c and FIG. 4d. The primary ordering and all rotated orderings have a starting pixel, denoted by the arrow entering the cell, and an ending pixel, denoted by an arrow leaving the cell. The starting pixel and the ending pixel for the orderings share a common face of the cell. This makes it possible to combine cells into larger (macro) orderings by matching the ending pixel of a first cell with the starting pixel of a next cell.

In order to ensure that the starting and ending pixels of the cells may be matched in the largest variety of combinations, it is desirable to define reverse orderings for the primary and rotated orderings. These reverse orderings for the 5 by 5 cell are shown in FIG. 4e through FIG. 4h.

Figure 5A:
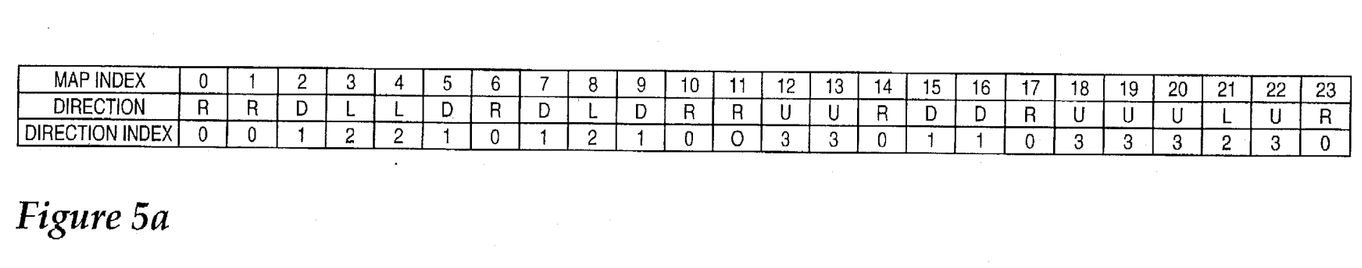
Figure 5B:
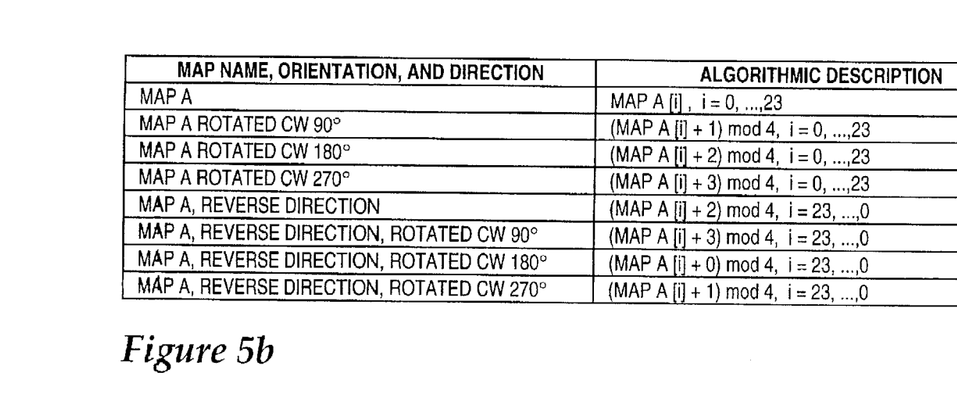

Representing each direction between the pixels in a cell by a number, the primary ordering can be defined by a short table of numbers, as shown in FIG. 5a. In FIG. 5a the number 0 represents the direction left-to-right between two pixels, the number 1 represents the direction up-to-down, number 2 represents right-to-left, and 3 represents down-to-up. Each rotation is then defined in relation to the primary ordering, by adding an offset, modulo 4, to the directions comprising the primary ordering. For example, FIG. 5b shows, the first rotation may be defined by adding one (1) to the values in the table for the primary ordering. The second and third orderings are defined by adding two (2) and three (3), respectively, to the numbers comprising the primary ordering. In this manner it is possible to define the rotated orderings in terms of the primary ordering using a single offset value. The reverse orderings are then defined by including with the primary or rotated ordering an indication of whether the ordering is reversed or not. Using this approach, eight orderings for the pixels in a cell may be defined with relatively little side information; less side information per cell reduces the storage requirements of the block comprised by the cells. It is readily apparent to one skilled in the art that the numbers chosen to represent the directions between cells, and the symbols defining whether the ordering is reversed or not, are merely exemplary and the invention is in no way limited to the specific values utilized.

Figure 6:
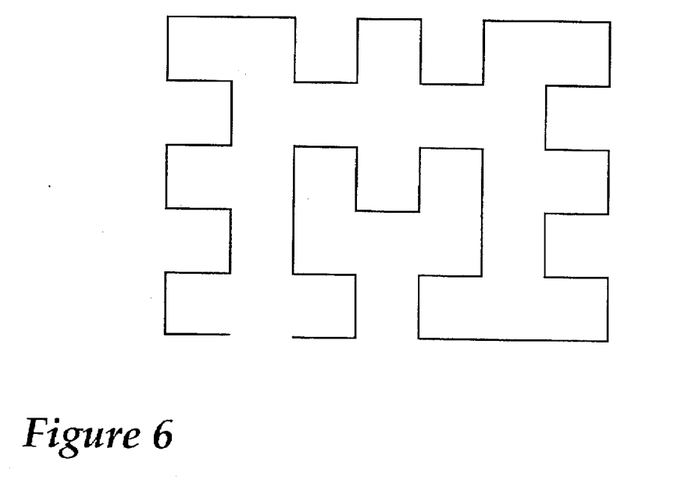

The cells within a block may be ordered to take advantage of the block's overall pixel content to increase the correlation of pixels in the ordered cells. For example, in video conferencing applications the content of the video information typically consists of a human speaker centered within a stationary background on the left, right, and top sides of the frame. This arrangement is commonly known as a "head and shoulders" arrangement, and it is illustrated in FIG. 6. The path shown in FIG. 6 exploits the head-and-shoulders frame content by tracing a contour through the frame which roughly approximates the location of correlated pixel data within the image. The path traces the shape of the human speaker and the stationary background on the top and sides. By tracing the portion of the image first that the human speaker typically occupies, one essentially places the most important pixel data first in the path. Hence, if one were to truncate the path, say to limit the data size, one would be more likely to retain the most important image data. The blocks derived for an image by application of the DWT preserve the spatial scene content of the image, and so the head-and-shoulders path may be applied when ordering the cells within each block of the image. An ordering of the cells in a 40 by 30 pixel block which exploits the head-and-shoulders content of the block is shown in FIG. 7.

Figure 7:
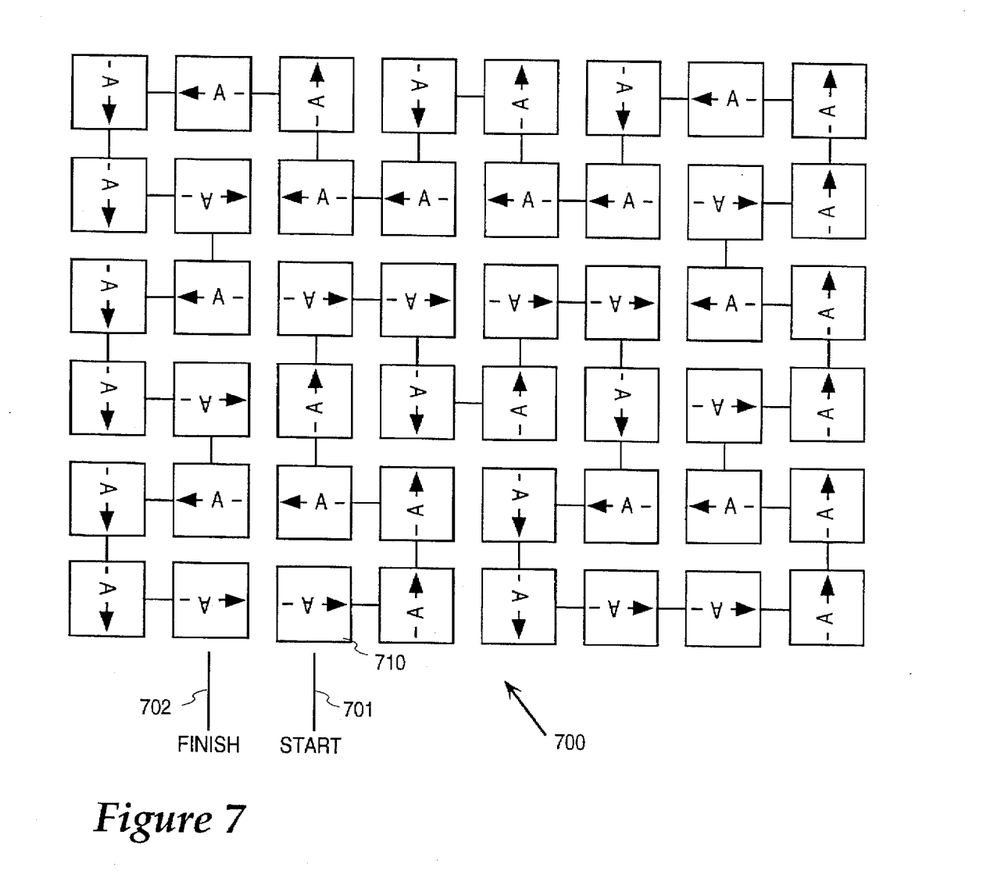
Figure 8:
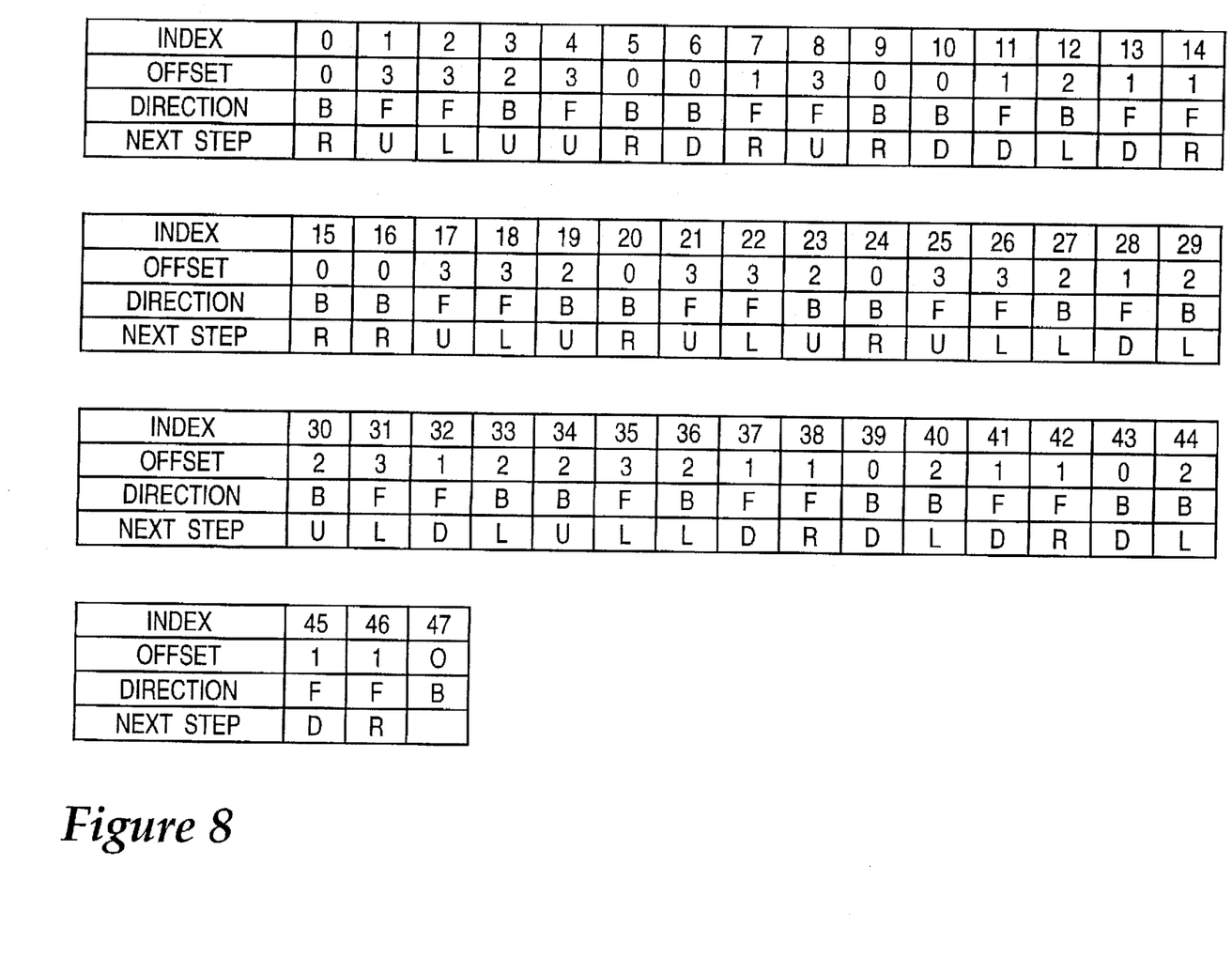

Referring to FIG. 7, a first cell 710 is chosen from the central region of the block 700 where the human speaker is located 710. The cell 710 is defined by its ordering and a direction to a next cell in the block. The ordering is chosen such that the start pixel and end pixel for the ordering enable the placement of the next cell along the head-and-shoulders path. FIG. 7 shows how the orderings and directions to a next cell are chosen so that the ordered cells traverse the central interior of the block first, then traverse the exterior of the block, consistent with the head-and-shoulders content of the block. The ordering of each cell is defined by an offset from the primary ordering (to indicate the degree of rotation) and a direction to indicate if the ordering is reversed or not. The ordering of all of the pixels in the block is then defined in terms of the ordering of each cell in the block and the directions between cells in the blocks, as shown in FIG. 8.

Figure 9:
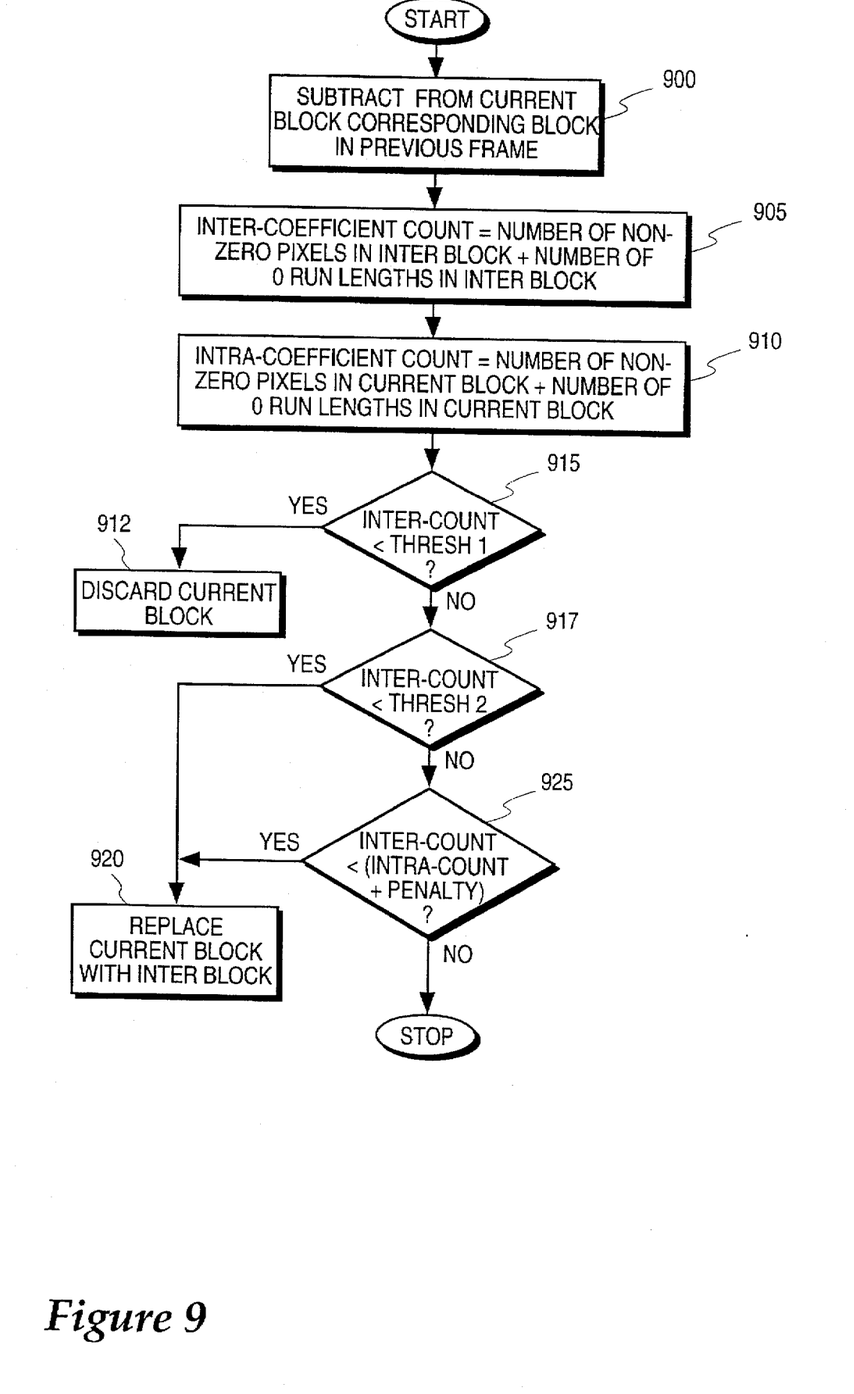

Referring again to FIG. 3, after ordering the pixels, a block decision step is performed 320 in the preferred embodiment. Alternatively, the block decision step may be performed after the quantization step 330. The block decision step 320 determines a representation for a block based upon a comparison of the block with a corresponding block in a prior frame. The corresponding block is a block in the prior frame derived using the same decomposition (combination of high and low pass filter steps) as the block in the current frame. A flow chart of the block decision step is shown in FIG. 9. At step 900, a corresponding block from the immediately previous frame is subtracted from the current block in the current frame to create an inter block. The inter block contains non-zero pixel values where the pixels in the two blocks were different, and zero values where the pixels in the two blocks were the same. The inter block tends to contain long runs of zero-valued pixels because the current block tends to be highly correlated with the block from the previous frame, especially where there is little motion between frames. An inter coefficient count is computed by adding the number of non-zero values in the inter block to the number of runs of zeros in the inter block (step 905). The inter coefficient count is a good indicator of the storage requirements of the inter block after coding, because the efficiency of common coding techniques is correlated to the number of non-zero pixel values and the number of zero run lengths in a block.

An intra coefficient count is computed for the current block by adding the number of non-zero values in the current block to the number of runs of zeros in the current block (step 910). An evaluation is then made of the inter and intra coefficient counts to determine the representation of the current block requiring the least storage space. If the inter coefficient count is less than a first threshold value (step 915), then the current block is dropped from current frame (step 912) because the differences between the current block and the previous block are insubstantial. If the inter coefficient count is greater than the first threshold but less than a second threshold value (step 917), then the current block is replaced with the inter block (step 920) because the number of differences between the current and previous blocks is substantial, but small enough that only the differences between the blocks need be represented. Finally, the inter coefficient count is compared to the intra coefficient count (step 925). If the inter coefficient count is less than the intra coefficient count plus a predetermined penalty, then the inter block requires less storage space than the current block, and so the current block is replaced by the inter block (step 920). Otherwise, the current block is retained.

When comparing the inter coefficient count to the intra coefficient count (step 925), a predetermined penalty is added to the intra coefficient count to compensate for the well-known quality of common encoding mechanisms to operate more efficiently on inter blocks. Thus, it is not enough that the intra count is less than the inter count. It must be substantially less to overcome the greater efficiency afforded to inter blocks. Assuming for the purposes of illustration that the block decision step is performed before quantization, then exemplary values for the first and second threshold values are 2 and 10, respectively, with a penalty value of 4. These values result in the discarding of blocks with little variation from the blocks in prior frames, without discarding many useful changes. Although the present embodiment uses information in the corresponding block immediately preceding the current block to compute the inter block, one skilled in the art can readily appreciate that the inter block may be computed in alternate ways without departing from the spirit of the invention. For example, in some applications it may be determined empirically that for best results the inter block is computed by subtracting the current block from the corresponding block from two frames prior, or by scaling the current block or prior block or both by a constant before subtraction.

Figure 10:
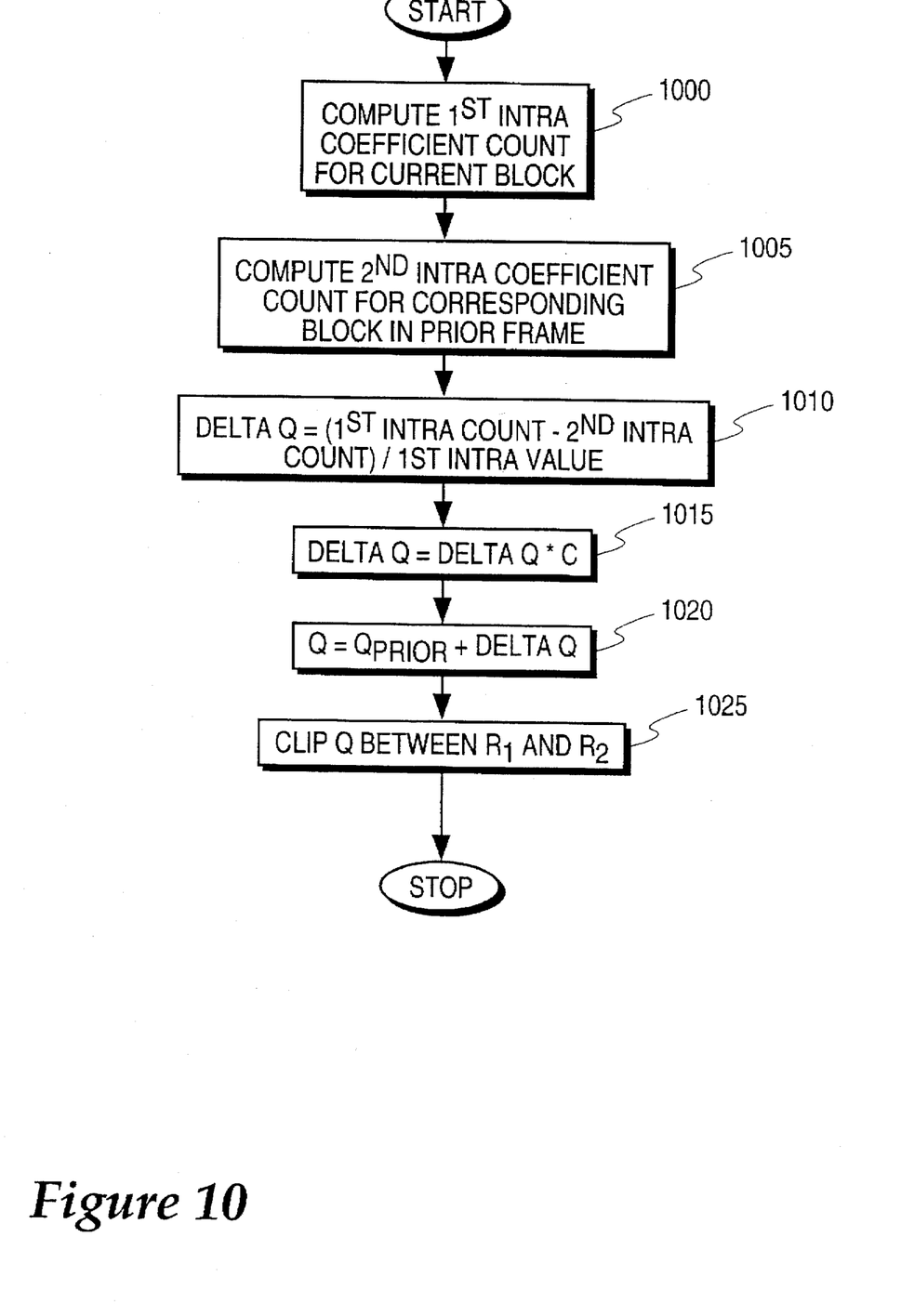

Referring again to FIG. 3, in one embodiment, the next step after making the block decision is quantization of the pixels in the block 330. Alternatively, the block decision step 320 may occur subsequent to the quantization step 350. During quantization 330, information from blocks in prior frames is preferably utilized when choosing quantization values for a current block. FIG. 10 shows the steps for computing the quantization value (coefficient) to use for the current block. In step 1000, the intra coefficient count for the current block is computed. This is done in the same manner as in FIG. 9, step 910. In addition, a second intra coefficient count is computed for the corresponding block in the immediately previous frame (step 1005). In step 1010, a quantization delta is computed by determining the percentage change between the coefficient counts of the two blocks. The percentage change is computed by subtracting the second count from the first and dividing the difference by the first count. The percentage change is scaled by a scalar C, or C may be set to unity for no scaling (step 1015). The present embodiment uses a quantization scalar equal to 2.0, although the invention is in no way limited to this value. The quantization delta is added to the quantization value for the prior block, the result being the quantization delta for the current block (step 1020). The quantization value for the current block is clipped so that it falls within a specified upper and lower range of permitted values (step 1025). Typical upper and lower ranges for the quantization value are 0 and 15, and 0 and 31.

Referring again to FIG. 3, after quantization, the block is encoded using coding techniques well known in the art 340. Possible coding techniques include run-length coding and entropy coding techniques such as Arithmetic and Huffman coding. The present invention is not limited to any specific technique. If, after ordering, quantizing, and coding all blocks in a frame, it is determined that a desired storage requirement has not been met for the frame, then the quantization and coding steps may be repeated for one or more blocks in the frame, using larger values of the quantization scalar C described in FIG. 10, step 1015. Increasing the quantization scalar C increases the quantization value to use for a block, which decreases the variation in pixel values in the quantized block and increases the number of runlength of zeros. This in turn increases the efficiency of the coding of the block, so that the storage requirements for a block are decreased. The quantization and coding steps may be repeated in this manner on one or more blocks until a desired storage requirement for the frame is achieved. In the preferred embodiment, the largest block in the frame is chosen first for re-quantization when the desired storage requirement is exceeded for the frame. The selection of which frames are re-quantized first is a design choice, although re-quantizing larger blocks may produce more substantial savings in storage than re-quantizing smaller blocks, because of the greater information content of larger blocks.

Another technique for achieving a desired storage requirement for a frame is to selectively drop blocks, starting with the largest, highest frequency blocks. Dropping such blocks results in a graceful degradation of the frame quality because each block resulting from the DWT successively retains or adds more detail to the smaller, lower frequency blocks. In the present embodiment, the block with the largest number of pixels is dropped first. This ensures rapid convergence on the desired storage requirements. Successively smaller blocks are dropped from the frame until the desired storage requirements is achieved. As each block is dropped, the frame remains recognizable although retaining less detail.

The specific arrangements and methods described herein are merely illustrative of the principles of the invention. Numerous modifications in form and detail may be made by those of ordinary skill in the art without departing from the scope of the present invention. For example, the values associated with quantization and directional coding are merely illustrative of the concepts behind the invention. Also, the selection of frames for re-quantization or dropping is not limited to the specific choices described herein.

Although this invention has been shown in relation to a particular embodiment, it should not be considered so limited. Rather, the invention is limited only by the scope of the appended claims.

We claim:

1. A method of ordering pixels in a matrix of pixels, the method comprising the steps of:

dividing the matrix into a plurality of cells of pixels;

ordering the pixels within each cell according to one of a plurality of pixel orderings, the plurality of pixel orderings comprising reverse orderings for a primary and rotated orderings; and identifying each cell by the pixel ordering for the cell and a cell direction to a next cell in the matrix.

2. The method of claim 1 in which the plurality of pixel orderings are defined by the steps of:

defining a plurality of pixel directions between the pixels in a cell, each pixel direction identified by a pixel direction number;

defining a primary pixel ordering, the primary pixel ordering comprising a sequence of pixel directions;

defining at least one rotated pixel ordering from the primary pixel ordering, each rotated pixel ordering defined by incrementing each pixel direction number by an offset; and defining a plurality of reverse pixel orderings, the reverse pixel orderings defined by reversing the sequence of pixel directions in the primary pixel ordering and each of the at least one rotated pixel orderings.

3. The method of claim 2 in which the pixel ordering of each cell in the matrix is identified by the offset of the pixel ordering and an indication of whether the pixel ordering is reversed.

4. The method of claim 1 further comprising the step of arranging the cell directions and pixels orderings of the cells in the matrix to form a Head-And-Shoulders path through the matrix.

5. The method of claim 1 in which the matrix of pixels is obtained by performing a forward DWT on a digital image.

6. An apparatus to order the pixels in a matrix of pixels, the apparatus comprising:

a memory;

a matrix of pixels stored in the memory, the matrix divided into a plurality of cells of pixels; and a processor to order the pixels within each cell according to one of a plurality of pixel orderings, the plurality of pixel orderings comprising reverse orderings for a primary and rotated orderings, the processor storing in the memory the pixel ordering for each cell and a cell direction for each cell, the cell direction identifying a direction to a next cell in the matrix.

7. The apparatus of claim 6 in which each pixel ordering further comprises:

a plurality of pixel directions between the pixels in a cell, each pixel direction identified by a pixel direction number;

a primary pixel ordering, the primary pixel ordering comprising a sequence of pixel directions;

at least one rotated pixel ordering from the primary pixel ordering, each rotated pixel ordering defined by incrementing each pixel direction number by an offset; and a plurality of reverse pixel orderings, the reverse pixel orderings defined by reversing the sequence of pixel directions in the primary pixel ordering and each of the at least one rotated pixel orderings.

8. The apparatus of claim 7 in which the pixel ordering of each cell in the matrix is identified by the offset of the pixel ordering and an indication of whether the pixel ordering is reversed.

9. The apparatus of claim 6 in which the processor further arranges the cell directions and pixels orderings of the cells in the matrix to form a Head-And-Shoulders path through the matrix.

10. The apparatus of claim 6 in which the processor further computes the matrix of pixels by performing a forward DWT on a digital image.

11. An apparatus for ordering pixels in a matrix of pixels, the apparatus comprising:

means for dividing the matrix into a plurality of cells of pixels;

means for ordering the pixels within each cell according to one of a plurality of pixel orderings, the plurality of pixel orderings comprising reverse orderings for a primary and rotated orderings; and means for identifying each cell by the pixel ordering for the cell and a cell direction to a next cell in the matrix.

12. The apparatus of claim 11 in which the means for ordering the pixels in a cell further comprises:

means for defining a plurality of pixel directions between the pixels in a cell, each pixel direction identified by a pixel direction number;

means for defining a primary pixel ordering, the primary pixel ordering comprising a sequence of pixel directions;

means for defining at least one rotated pixel ordering from the primary pixel ordering, each rotated pixel ordering defined by incrementing each pixel direction number by an offset; and means for defining a plurality of reverse pixel orderings, the reverse pixel orderings defined by reversing the sequence of pixel directions in the primary pixel ordering and each of the at least one rotated pixel orderings.

13. The apparatus of claim 12 in which the pixel ordering of each cell in the matrix is identified by the offset of the pixel ordering and an indication of whether the pixel ordering is reversed.

14. The apparatus of claim 11 further comprising means for arranging the cell directions and pixels orderings of the cells in the matrix to form a Head-And-Shoulders path through the matrix.

15. The apparatus of claim 11 further comprising logic to compute the matrix of pixels by performing a forward DWT on a digital image.

16. A method of quantizing the values of the pixels in a first matrix of pixels, the method comprising the steps of:

adding a number of non-zero pixels in the first matrix to a number of runs of zero valued pixels in the first matrix to compute a first coefficient count;

adding a number of non-zero pixels in a second matrix of pixels to a number of runs of zero valued pixels in the second matrix to compute a second coefficient count, the second matrix of pixels having a prior quantization value;

computing a percentage difference between the first and second coefficient counts;

scaling the percentage difference between the first and second coefficient counts by a constant to determine a quantization delta; and adding the quantization delta to the prior quantization value to determine a quantization value for the first matrix of pixels.

17. The method of claim 16 in which the first matrix of pixels is obtained by performing a forward DWT on a first digital image.

18. An apparatus to quantize values of pixels in a first matrix of pixels, the apparatus comprising:

a memory to store the first matrix of pixels;

a first coefficient count, the first coefficient count comprising the sum of a number of non-zero pixels in the first matrix and a number of runs of zero valued pixels in the first matrix;

a second coefficient count, the second coefficient comprising the sum of a number of non-zero pixels in a second matrix of pixels and a number of runs of zero valued pixels in the second matrix, the second matrix of pixels having a prior quantization value; and a processor, the processor computing a percentage difference between the first and second coefficient counts, the processor further scaling the percentage difference between a first and a second intra value by a constant to determine a quantization delta, the processor further determining a quantization value for the first matrix of pixels by adding the quantization delta to the prior quantization value.

19. The apparatus of claim 18 in which the processor further computes the first matrix of pixels by performing a forward DWT on a digital image.

20. An apparatus to quantize values of pixels in a first matrix of pixels, the apparatus comprising:

means for computing a first coefficient count by adding a number of non-zero pixels in the first matrix to a number of runs of zero valued pixels in the first matrix;

means for computing a second coefficient count by adding a number of non-zero pixels in a second matrix of pixels to a number of runs of zero valued pixels in the second matrix;

means for computing a percentage difference between the first and second coefficient counts;

means for scaling the percentage difference between a first and a second intra value by a constant to determine a quantization delta; and means for determining a quantization value for the first matrix of pixels by adding the quantization delta to the prior quantization value.

21. The apparatus of claim 20 in which the first matrix of pixels is obtained by performing a forward DWT on a first digital image.

22. A method of reducing the amount of memory required to store a digital image, the method comprising the steps of:

transforming the image into a plurality of blocks, each block comprising a matrix of pixels;

for each block;

ordering the pixels in the block to form an ordered block;

adding a number of non-zero pixels in the ordered block to a number of runs of zero valued pixels in the ordered block to compute an intra value;

subtracting the pixels in the ordered block from the pixels in a second ordered block in a second image to compute an inter block;

adding a number of non-zero pixels in the inter block to a number of runs of zero valued pixels in the inter block to compute an inter value;

if the inter value is less than a first threshold value, discarding the block from the image;

if the inter value is greater than the first threshold value but less than a second threshold value, replacing the block with the inter block; and if the inter value is greater than the second threshold value and less than a sum of the intra value plus an adjustment, replacing the block with the inter block.

23. The method of claim 22 in which the step of transforming the image into a plurality of blocks comprises a forward DWT on the image.

24. The method of claim 22 further comprising the step of quantizing the block.

25. The method of claim 24 further comprising the step of coding the block.

26. The method of claim 24 in which the step of quantizing the block is repeated using a larger quantization value until a desired memory storage requirement is achieved for the image.

27. An apparatus to reduce the amount of memory required to store a digital image, the apparatus comprising:

a memory to store the image; and a plurality of blocks obtained from the image, each block comprising a matrix of pixels;

a processor to order the pixels in each block to form a plurality of ordered blocks;

a first coefficient count comprising the sum of a number of non-zero pixels in the ordered block and a number of runs of zero valued pixels in the ordered block;

an inter block comprising the difference between the pixels in the ordered block and the pixels in a second ordered block in a second image;

a second coefficient count comprising the sum of a number of non-zero pixels in the inter block and a number of runs of zero valued pixels in the inter block;

the processor discarding the block from the image if the second coefficient count is less than a first threshold value, the processor replacing the block with the inter block if the second coefficient count is greater than the first threshold value but less than a second threshold value; and the processor replacing the block with the inter block if the second coefficient count is greater than the second threshold value and less than a sum of the first coefficient count plus an adjustment.

28. The apparatus of claim 27 in which the plurality of blocks are obtained by performing a forward DWT on the image.

29. The apparatus of claim 22 in which the processor further quantizes the block.

30. The apparatus of claim 29 in which the processor further encodes the block.

31. The apparatus of claim 29 in which the processor quantizes the block repeatedly using a larger quantization value each time, until a desired memory storage requirement is achieved for the block.

32. An apparatus to reduce the amount of memory required to store a digital image, the apparatus comprising:

means for transforming the image into a plurality of blocks, each block comprising a matrix of pixels;

means for ordering the pixels in each block to form a plurality of ordered blocks;

means for computing a first coefficient count by adding a number of nonzero pixels in the ordered block to a number of runs of zero valued pixels in the ordered block;

means for computing an inter block by subtracting the pixels in the ordered block from the pixels in a second ordered block in a second image;

means for computing a second coefficient count by adding a number of non-zero pixels in the inter block to a number of runs of zero valued pixels in the inter block;

means for making a block decision, the means for making the block decision further:

discarding the block from the image if the second coefficient count is less than a first threshold value;

replacing the block with the inter block if the second coefficient count is greater than the first threshold value but less than a second threshold value; and replacing the block with the inter block if the second coefficient count is greater than the second threshold value and less than a sum of the first coefficient count plus an adjustment.

33. The apparatus of claim 27 in which the means for transforming the image into a plurality of blocks comprises means for performing a forward DWT on the image.

34. The apparatus of claim 27 further comprising means for quantizing the block.

35. The apparatus of claim 34 further comprising means for coding the block.

36. The apparatus of claim 34 in which means for quantizing the block repeatedly quantizes the block using a larger quantization value each time the block is quantized, until a desired memory storage requirement is achieved for the block.

* * * * *